United States Patent [19]

Simpson

[11] Patent Number: 4,527,583

[45] Date of Patent: Jul. 9, 1985

[54] ELECTROPNEUMATIC TRANSDUCER SYSTEM

[75] Inventor: Donald C. Simpson, Norton, Mass.

[73] Assignee: Dresser Industries, Inc., Dallas, Tex.

[21] Appl. No.: 513,162

[22] Filed: Jul. 12, 1983

[51] Int. Cl.³ .................... F15B 5/00; G05D 23/00
[52] U.S. Cl. .......................... 137/82; 137/487.5; 73/754; 236/84; 323/365
[58] Field of Search ............... 137/82, 85, 487.5; 236/84; 323/365; 73/754; 340/870.3

[56] References Cited

U.S. PATENT DOCUMENTS

| | | | |
|---|---|---|---|
| 3,882,881 | 5/1975 | Machenzie et al. | 236/84 X |
| 4,202,218 | 5/1980 | Romo | 73/766 |
| 4,337,665 | 7/1982 | Sato et al. | 73/708 |
| 4,444,056 | 4/1984 | Romo et al. | 73/708 |

FOREIGN PATENT DOCUMENTS 2065331 6/1981 United Kingdom .

Primary Examiner—William E. Wayner

[57] ABSTRACT

A temperature compensation circuit is provided which can be used for span temperature compensation in an electropneumatic transducer system and which includes a constant current generator circuit coupled to a bridge of piezo resistances in a pressure transducer to supply a constant current through one piezo resistance of the bridge to common. The Electropneumatic Transducer System includes a zeroing circuit, a voltage chopping circuit, a linearity correction circuit, a low-current shut-off circuit, and a high-current shut-off circuit to provide hard turn-ons and hard turn offs of the system at the lower and upper ends of the pressure output range or span. The Electropneumatic Transducer System also includes a voltage railsplitting circuit arrangement to minimize the operating currents, and voltages. With these features, the Electropneumatic Transducer System is particularly adapted for use in hazzardous combustible atmospheres where Intrinsic Saftey and accuracy are required.

18 Claims, 12 Drawing Figures

ELECTROPNEUMATIC TRANSDUCER SYSTEM

FIELD OF THE INVENTION

The present invention relates to electropneumatic transducers and, more particularly, to an electropneumatic transducer system for converting an electrical current, representing a control setting, to mechanical movement of a piezoelectric device which is utilized to control pressure, such that the pressure output of the system is accurately, and directly or inversely, related to the current input.

BACKGROUND OF THE INVENTION

In chemical processing plants and power plants, pneumatic systems are utilized for controlling various operations. Such pneumatic systems are analogous to electrical systems and it is often desirable to convert from pressures to voltages or currents, and then back from currents or voltages to pressures so that the system can be a combined pneumatic system and electrical system for control and monitoring purposes.

In this respect, it is often desirable to effect pressure changes in a pneumatic system from a remote control room without the need for extending piping for conducting pressure levels to the control room. It is much easier to extend wire conductors from a control panel in the control room to the location of a pressure operated pneumatic actuator or valve positioner. Accordingly, an electropneumatic transducer system is needed to convert the electrical signal to a pressure signal at the location of the pressure control element. The electrical signal is connected to the control room by wire conductors which may be as much as 1000 feet or more in length. Then the electropneumatic transducer system with a pressure control element at the remote location must be operable in response to a change in an electrical signal from the control room to effect a corresponding change in pressure.

Frequently, hazardous combustible atmospheres exist in the area of the electropneumatic transducer system. Accordingly, it is desired that low electrical currents and voltages are employed to ensure a condition of Intrinsic Safety where there is insufficient energy in any of the exposed circuit elements, e.g., wire conductors that could create a spark and ignite the hazardous combustible atmosphere. Typically, this is achieved by utilizing voltages not more than 10 volts on the output terminals from the electropneumatic transducer system and output or input currents which are not more than 20 mA.

Many of the presently available electropneumatic transducer systems, although having Intrinsic Safety suitable for operation in hazardous combustible environment, are limited in their use for a variety of reasons. First of all, many are not accurate or stable and are sensitive to temperature changes and vibrations which cause the output pressure to fluctuate. Some of these systems have a limited dynamic range because of the low voltage and current restrictions placed on the system and have low loop gain. Other of these electropneumatic transducer systems are hard to adjust. In addition, many of these electropneumatic transducer systems are housed in rather large housings and the manufacturer of such systems requires complex manufacturing and assembling techniques and special equipment. As a result, such prior systems are very expensive to produce. Also, if an explosion-proof housing is needed for the electropneumatic transducer system, the cost of the system is further increased.

Recently, a signal converting unit intended for use in a pneumatic control system has been proposed which is more accurate than many of the previously proposed electropneumatic transducer systems. Such signal converting unit is disclosed in a Patent Cooperation Treaty application filed at the Swedish Patent Office by Saab-Scania entitled A Signal Converting Unit Intended To Be Incorporated In A Pneumatic Control System, under PCT Ser. No. WO 80/01826, and published on Sept. 4, 1980 in English.

This signal converting unit receives control signals for controlling a pressure output. The pressure output is generated from a pressure source which is coupled to a nozzle and to the pressure output line. A movable piezoelectric element, flap or tongue is positioned adjacent the nozzle orifice for controlling the amount of pressurized air that is allowed to escape from the nozzle. The closer the piezoelectric element to the nozzle, the greater the output pressure, and the farther away the piezoelectric element, the lower the pressure, since more air is allowed to escape from the nozzle which reduces the pressure output. The output pressure is supplied to a pressure transducer that produces a feedback signal, a signal which can be conditioned or amplified so as to be directly related to the output pressure. This feedback signal is then compared with an input control signal, and if there is a difference between them, the comparator sends an output signal to an integrator circuit which controls the voltage applied to the piezoelectric element to cause the piezoelectric element to be moved toward or away from the nozzle orifice. In this way, the output pressure follows and is directly related to the input control signal.

As will be described in greater detail hereinafter, the electropneumatic transducer system of the present invention differs from the previously proposed system having a feedback control loop by providing:

(a) for operation of the electrical circuit for the system about a low reference and bias voltage between rail voltages of the system whereby a railsplitting circuit arrangement can be constructed with low input voltages to each circuit;

(b) a high current shutoff circuit and a low current shutoff circuit to provide hard turn-ons of the control nozzle of the system and hard turn-offs of the control nozzle at the upper and lower ends of the pressure range;

(c) a pressure transducer having piezoresistances in a Wheatstone bridge and a highly accurate zero and span temperature correction circuit;

(d) a number of open circuit contacts into which jumpers can be inserted and removed for adapting the electropneumatic transducer system for many different modes of operation such as reversal of the input/output modes of operation;

(e) a nonlinearity correction circuit coupled to the pressure transducer of the system; and (f) circuitry for providing Galvanic isolation of the voltage sensitive nozzle flapper of the system.

SUMMARY OF THE INVENTION

According to the invention, there is provided for use in a control system for controlling an output pressure in a pneumatic system, an electropneumatic transducer system of the type comprising a chamber coupled to a source of pressurized gas and having a nozzle with an outlet orifice connected to said chamber and an outlet conduit coupled to said outlet chamber; a pressure transducer coupled to said outlet conduit for monitoring the pressure therein; a comparator; means for supplying an electrical signal to one input of said comparator related to an input control signal; means coupled to said transducer for supplying an electrical signal related to the actual output pressure sensed to the other input of said comparator; a voltage sensitive nozzle flapper mounted adjacent said nozzle orifice and electrically coupled to the output of said comparator whereby said electropneumatic transducer system supplies an output pressure directly related to the electrical input signal to the pneumatic system, the improvement residing in said signal supplying means comprising a voltage regulator circuit having means for converting an incoming current signal to a regulated voltage $V_R$ above a common $V_C$, and a low reference and bias voltage $V_B$; and, the electrical circuitry of said electropneumatic transducer system being constructed and arranged to operate about said low reference and bias voltage $V_B$ thereby to minimize the input voltage requirements to said electropneumatic transducer system.

Also according to the invention, the electropneumatic transducer system can include a plurality of open circuit contacts and jumpers which can be inserted across those contacts to change operating parameters of the electropneumatic transducer system and modes of operation of the system, such as reversal of the input-/output modes of operation.

Also according to the invention, the electropneumatic transducer system can include an isolation circuit coupling the comparator with the voltage-sensitive flapper thereby to provide galvanic isolation for the voltage-sensitive flapper.

Further according to the invention, the electropneumatic transducer system can include a high-current shutoff circuit coupled between the signal supplying means and the comparator for causing the output of the comparator to go to saturation when the current input signal reaches a predetermined upper value range.

Further according to the invention, the electropneumatic transducer system can include a low current shutoff circuit coupled between the signal supply means and an input of the comparator for causing the output of the comparator to go to zero when the input current signal reaches a predetermined lower value range.

Further according to the invention, the electropneumatic transducer system can include a non-linearity correction circuit coupled to the output of the pressure transducer for correcting the non-linearity of the transducer output signal.

Still further according to the invention, the electropneumatic transducer system can include a span temperature compensation circuit coupled to the pressure transducer and to the one input of the comparator for providing span temperature compensation over the span of input current values and also some zero temperature compensation at the threshold input current value.

Additionally according to the invention, a temperature compensation circuit is provided which can be used for span temperature compensation and which includes a constant current generator circuit coupled to a bridge of piezoresistances in a pressure transducer to supply a constant current through one piezoresistance of the bridge to common. This constant current generator circuit can be realized by a voltage divider circuit coupled to an output of a comparator with a junction of the voltage divider circuit being coupled to one corner of the bridge at a junction between two piezoresistances, the opposite ends of which are connected respectively to $V+$ and common, and the other two corners of the bridge being coupled respectively to the inputs of the comparator.

In one commercial realization of the electropneumatic transducer system of the present invention, an input current signal is supplied through a zeroing circuit and a current-to-voltage converter circuit having a span setting circuit. At the same time, the input current is supplied to a voltage regulator circuit for generating a plus rail voltage, a common rail voltage (common or ground), and a bias voltage about which the circuit is operated.

A pressure transducer comprising piezoresistances is coupled to an output pressure line and has an electrical output coupled to a span temperature correction circuit. The output from the span temperature correction circuit and the output from the current-to-voltage converter circuit are both supplied to inputs of a high gain comparator. The output of the high gain comparator is supplied to a voltage chopping circuit, including a free-running as stable multivibrator, and four voltage chopping transistors. The output from the voltage chopping circuit is supplied to a transformer and the output from the transformer is rectified and supplied to a voltage sensitive nozzle flapper which is typically a piezoceramic sandwich device, often referred to as a piezoceramic bender. A linearity correction circuit is coupled between the output of the span temperature correction circuit and system common. A low current shutoff circuit has inputs supplied from the voltage regulator circuit and an output coupled to an electronic switch coupled between the output of the span temperature correction circuit and system common.

A high current shutoff circuit also has inputs coupled to outputs from the voltage regulator circuit and an output coupled to an electronic switch across a resistor in the gain circuit for the high gain comparator. The electrical connections between the pressure transducer and the span temperature correction circuit are provided with some open circuit contacts for receiving jumpers. Likewise, the output of the transformer filter circuit coupled to the piezoceramic bender have open circuit contacts for receiving jumpers. Further, the low current shutoff circuit and the high current shutoff circuit have open circuit contacts for receiving jumpers. All of these jumpers enable the operating parameters of the circuit to be modified and/or reversed.

DESCRIPTION OF THE PREFERRED EMBODIMENT(S)

Figure 1:
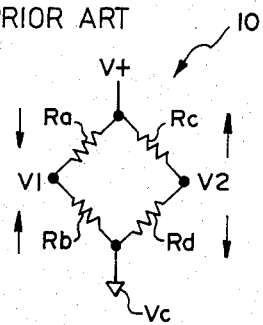
FIG. 1 is s schematic circuit diagram of a prior art Wheatstone bridge arrangement of four piezoresistors in a solid state pressure transducer.

Referring now to FIG. 1, there is illustrated therein a Wheatstone bridge 10 comprised of four piezoresistors Ra, Rb, Rc, and Rd. The bridge 10 is typically utilized in a solid state pressure sensor of the type sold by Ametek Controls of Feasterville, Pa.

The arrows adjacent the reference characters Ra, Rb, Rc and Rd indicate the change (up or down) in resistance of each of those resistors Ra through Rd when gas pressure is applied to the pressure sensor.

As shown, a positive voltage V+ is applied to the upper corner of the bridge 10 and the lower corner of the bridge 10 is connected to system ground or common $V_C$. A first voltage V1 is generated at the left-hand corner of the bridge 10 and a second voltage V2 is generated at the right-hand corner of the bridge 10.

As gas pressure is applied to the sensor, the resistors Ra and Rd decrease in resistance, while the resistors Rb and Rc increase in resistance, thus generating an increase in the voltage difference between V1 and V2 in a positive direction when subtracting V2 from V1.

The voltage difference V1 minus V2 is calculated as follows:

$$(V1 - V2) = Ca\left(\frac{V+}{Ra}\right) - Cc\left(\frac{V+}{Rc}\right)$$

where $Ca = \dfrac{1}{\frac{1}{Ra} + \frac{1}{Rb}}$ and $Cc = \dfrac{1}{\frac{1}{Rc} + \frac{1}{Rd}}$ Thermal errors occur because the resistors change with temperature, T. Typically, the resistors Ra through Rd increase by 4%-8% for a temperature change of 25° C. to 75° C. In addition, the resistors change with a change in pressure, P, applied to the sensors. Thus, the resistors are a function of T, P, and combinations of T and P. If a constant current is injected in one of the resistors (such as Rb), the voltage drop across that resistor will increase by 4%–8% of the current for a temperature change of 25° C. to 75° C.

Figure 2:
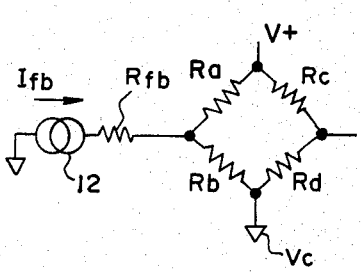
FIG. 2 is a schematic circuit diagram of the bridge shown in FIG. 1 with a constant current injected into one of the piezoresistors of the bridge to effect temperature compensation according to the teachings of the present invention.

Such a circuit is shown in FIG. 2 where a constant feedback current generator 12 supplies a current $I_{fb}$ through a resistor $R_{fb}$ to and through Rb to common $V_C$.

This increase in the voltage drop across Rb is used to reduce the thermal error between V1 and V2. In this respect, the resistor Rb acts as a thermometer in the circuit shown in FIG. 2, the scale of which exactly matches the error function which is to be corrected. This is demonstrated as follows:

$$V1 = Ca\left(\frac{V-}{Ra} + I_{fb}\right)$$

$$V1 - V2 = Ca\left(\frac{V+}{Ra} + I_{fb}\right) + Cc\frac{V+}{Rc}$$

Since $I_{fb}$ is not a function of Ra through Rd, changes in its value affect (V1−V2) independently of Ra through Rd.

Figure 3:
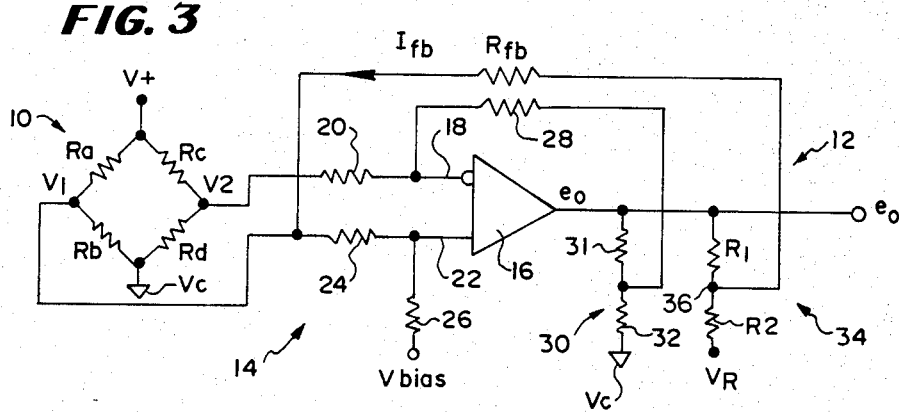
FIG. 3 is a schematic circuit diagram of a commercial realization of the circuit shown in FIG. 2, including the Wheatstone bridge, a high gain amplifier, and a constant current generator circuit.

A commercial realization of a circuit for injecting constant current through Rb is shown in FIG. 3 and is generally identified by reference numeral 14. This circuit 14 includes a high gain amplifier 16 having an inverting input 18 coupled through a resistor 20 to V2 and an input 22 coupled through a resistor 24 to V1. A bias voltage (Vbias) is also supplied through a resistor 26 to the input 22.

A high gain feedback loop consisting of a resistor 28 is coupled from a voltage divider circuit 30 comprising resistors 31 and 32 which are connected between $e_o$ of the amplifier 16 and $V_C$ to the input 18.

The current generator 12 is defined by a voltage divider circuit 34 comprising resistor $R_1$ and $R_2$ which are connected between $e_o$ and a regulated voltage $V_R$. The resistor Rfb is connected between a junction 36 between resistors $R_1$ and $R_2$ and V1 whereby a feedback voltage $e_{fb}$ is established.

As shown, V1 and V2 are fed into inputs 22 and 18 of amplifier 16. A small portion of the output voltage $e_o$ from junction 36 is fed to the resistor bridge 10 of the pressure sensor through resistor Rfb in a positive feedback sensor to supply current to Rb. As a result, as temperature increases, the voltage drop across Rb increases and the input to the amplifier 16 increases. This compensates for negative span temperature coefficient of the sensor for changes in temperature for an input pressure value change of 3 to 15 psi. The amount of compensation is determined by the amount of current being fed back through Rfb. The voltage divider $R_1$ and $R_2$ can be selected such that $I_{fb}$ is span dependent only, of some combination of zero and span. This is demonstrated as follows:

$$e_{fb} = C\frac{e_o}{R_1} + \frac{V1}{Rfb} + \frac{V_R}{R_2} \quad C = \frac{1}{\frac{1}{R_1} + \frac{1}{Rfb} + \frac{1}{R_2}}$$

If $I_{fb}=0$ (span dependent only), let $e_{fb}=V1$ when $e_o=$zero input pressure signal. Accordingly:

$$e_{fb} = V1 = C\left[\frac{e_o(0)}{R_1} + \frac{V1}{Rfb} + \frac{V_R}{R_2}\right] \text{for } I_{fb} = 0$$

For $I_{fb} \neq 0$ (zero and span dependent), then:

$$e_{fb} \neq V1 = \left[ C \frac{e_o(0)}{R_1} + \frac{V1}{R_{fb}} + \frac{V_R}{R_2} \right] \text{for } I_{fb} \neq 0$$

In this manner, $I_{fb}$ can compensate for both zero and span temperature errors.

Figure 4:
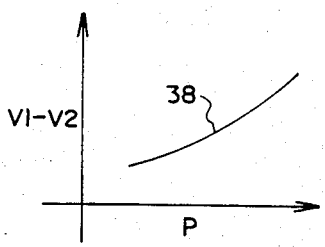
FIG. 4 is a graph of the output voltage $e_o$ from the amplifier relative to the voltage difference V1 minus V2 of the bridge shown in FIG. 3.
Figure 5:
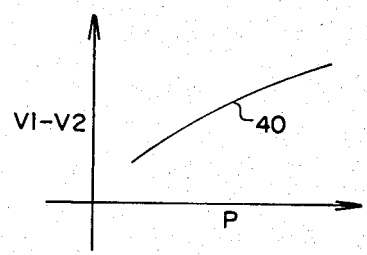
FIG. 5 is a graph of the voltage difference, V1 minus V2, relative to changes in pressure.

The positive feedback also introduces a slight non-linearity into the high gain amplifier 16. This non-linearity can be adjusted by various combinations of Rfb, $R_1$, and $R_2$. The non-linearity is in the direction that gain is increased as the span increases as illustrated in exaggerated scale in the graphs of FIGS. 4 and 5. In other words, curve 38 of $e_o$ versus V1-V2 curves in an opposite direction to the non-linearity curving of curve 40 of V1-V2 versus pressure P in a typical pressure sensor. Thus, the positive feedback technique when adjusted properly compensates for both the large thermal errors and small non-linearity errors associated with piezoresistor bridge pressure sensors.

As a result, by using resistor Rb of the pressure sensor as a thermometer and using positive feedback to inject a constant current into the resistor $R_b$ to correct for thermal errors and then adjusting the values of $R_1$ and $R_2$, the positive feedback signal is span dependent only or some combination of the zero setting (e.g., 4 mA) and the span setting (e.g., 4 to 20 mA) to correct for both zero and span thermal errors.

Also, the positive feedback signal is used to introduce a small non-linearity into the circuit 14 in a direction to correct for the small non-linearity of the pressure sensor piezoresistors Ra through Rd.

As an example of how circuit 14 functions, assume that for a pressure range of 3 to 15 psi, $e_o$ changes +0.5 v to +3.0 v. Then, let $R_1 = 100$ k $\Omega$; $R_2 = 127$ k $\Omega$; and $V+ = 4.725$ v.

Then
$e_{fb}$ (for $e_o = 0.5$ v) = 2.361 v
$I_{fb}$ (for $e_o = 0.5$ v) = 20 nA
$e_{fb}$ (for $e_o = 3.0$ v) = 3.760 v
$I_{fb}$ (for $e_o = 3.0$ v) = 14 $\mu$A
and $I_{fb} = 20$ nA to 14 nA for P = 3 to 15 psi and $e_o = 0.5$ to 3.0 v Assume that Rb increases from 4000 $\Omega$ at 25° C. to 4240 ohms at 75° C. (6% increase with temperature).

For $e_o = 0.5$ v and $I_{fb} = 20$ nA, V1 will increase from 80 $\mu$V to 85 $\mu$V due to the temperature shift. This is a net change of 5$\mu$. If the full scale output of V1-V2 is 40 mV for 3 to 15 psi, then 5 $\mu$V is a 0.13% zero error.

For $e_o = 3.0$ v and $I_{fb} = 14$ $\mu$A, V1 will increase from 56 mv to 59 mv due to the temperature shift. This is a net change of 3 mv out of a full scale of 40 mv or +7.5% span shift. Again, other combinations can be made by changing the values of $R_1$, $R_2$, and $R_{fb}$.

Figure 6:
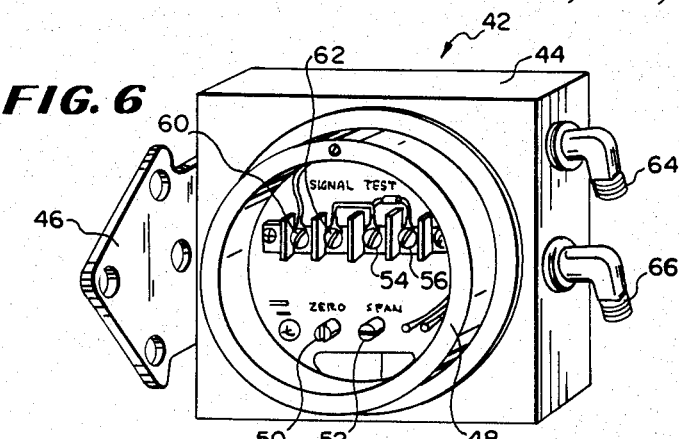
FIG. 6 is a perspective view of a commercial realization of the pressure transducer system of the present invention having incorporated therein the circuit arrangement shown in FIG. 3, and shows a housing for the system and a panel thereof having a zero adjust screw, a span adjust screw, signal input terminals, and test terminals.

Referring now to FIG. 6 there is illustrated therein an electropneumatic transducer system 42 constructed in accordance with the teachings of the present invention. As shown, the system 42 includes a housing 44 of explosion proof construction and which is designed for not only indoor mounting but also for mounting in harsh exterior environments where the housing 44 could be exposed to high fungus, high humidity or salt.

A mounting flange 46 is fixed to the housing 44 and provides simple means for mounting the transducer system 42 in any desired location. Also, a cylindrical collar is mounted to one side of the housing 44 and extends outwardly therefrom and a transparent or solid cover (not shown) is adapted to be mounted over the collar 48 in which are situated a zero (low current range) setting screw 50, a span (current range) setting screw 52, a pair of test terminals 54 and 56 for testing the electrical circuit 58 (FIGS. 7 and 8) of the system 42 and signal input terminals 60 and 62 to which conductors (not shown) can be connected for supplying an input current to the system 42 according to the usual manner of employing such devices.

The housing 44 has a supply pressure inlet fitting 64 and a controlled outlet pressure fitting 66.

Figure 7:
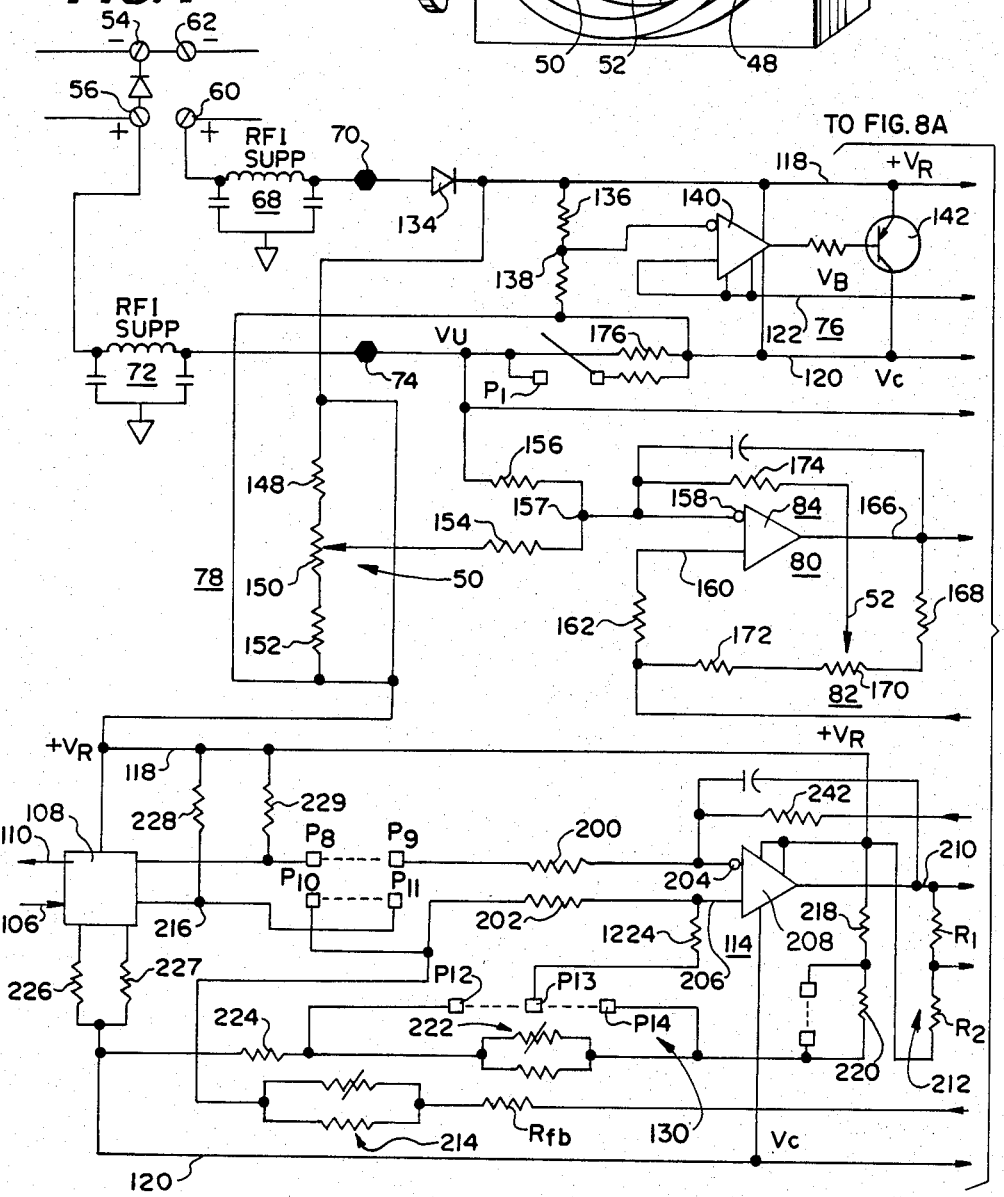
FIGS. 7, 8A and 8B together comprise a schematic circuit diagram of the electropneumatic transducer system of the present invention.
Figure 8A:
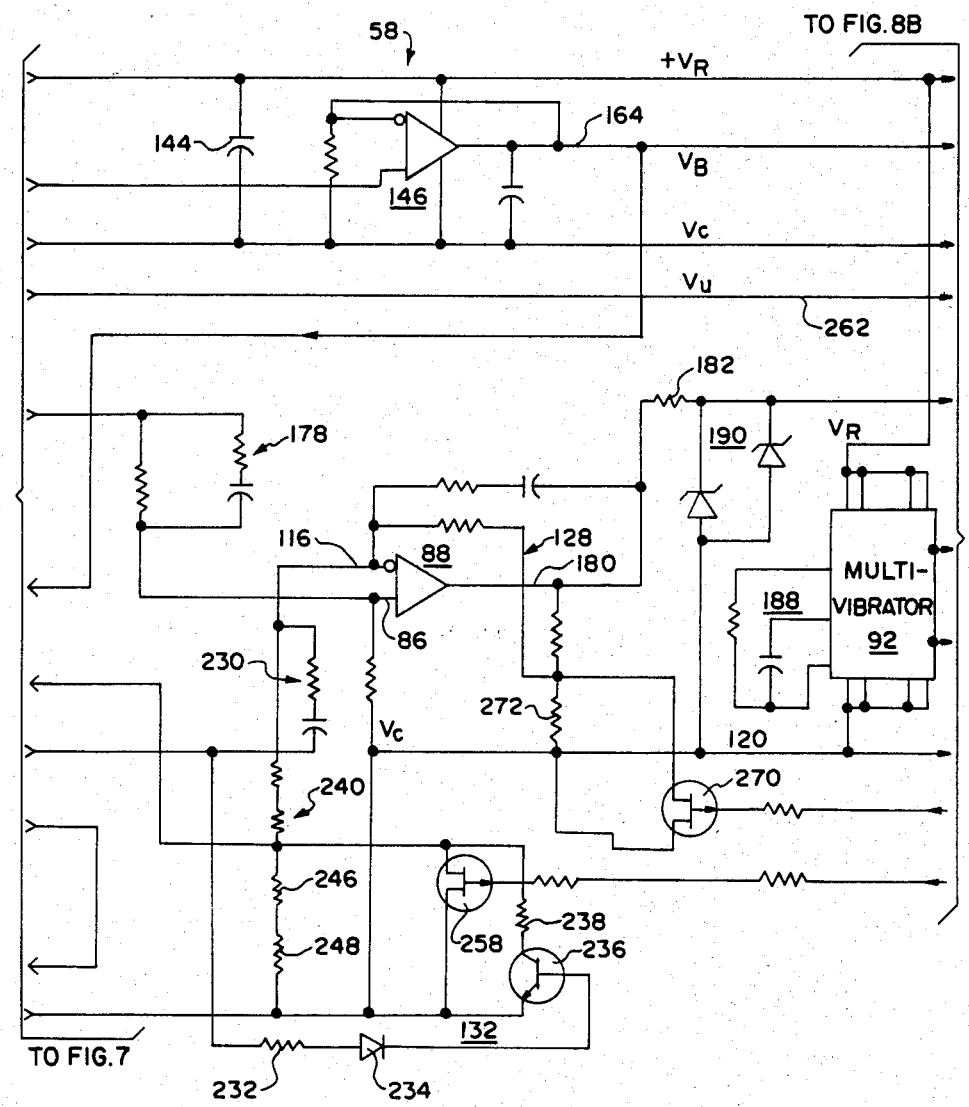
Figure 8B:
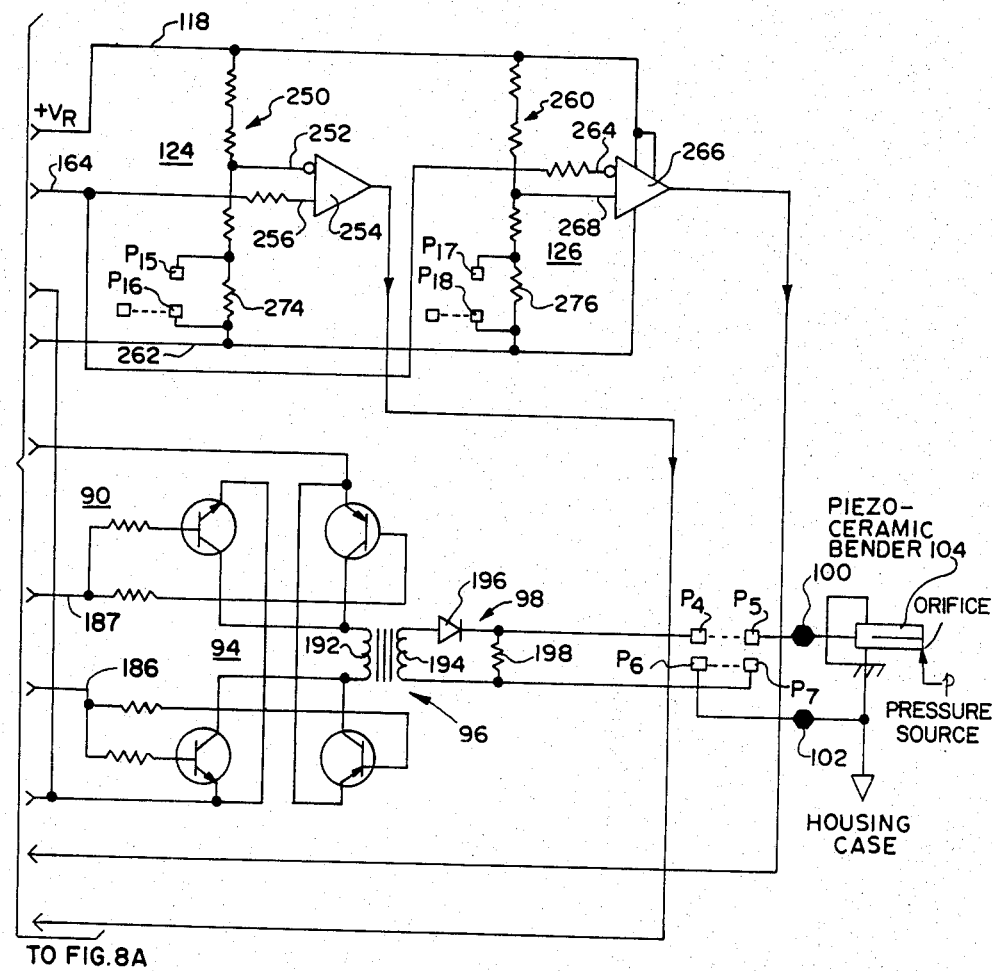

Referring now to the electrical circuit 58 (shown in FIGS. 7, 8A and 8B) of the system 42 shown in FIG. 7, the customers' line connections are coupled to the input terminals 60 and 62 with terminal 60 being the positive input terminal and terminal 62 being the negative input terminal as shown. The terminal 60 is connected through a radio frequency interference suppressor filter circuit 68 to a so-called red terminal 70. In similar manner, the negative terminal 62 is coupled through the test terminals 54 and 56 and through a radio frequency interference suppression filter circuit 72 the output of which is coupled to a so-called blue terminal 74.

To the red and blue terminals 70 and 74 are connected the various circuits that comprise the electrical circuit 58. These circuits can be briefly identified as follows.

First of all the output or current that is coming in to the red terminal 70 is supplied to a voltage converting circuit 76. This output from red terminal 70 is also supplied to a zero setting circuit 78 to which the set screw 50 is mechanically coupled.

The output of the zero setting circuit 78 is then supplied to a current-to-voltage converting circuit 80 having a span setting circuit 82 including the set screw 52 mechanically coupled thereto forming part of a gain control for an amplifier 84 of the current to voltage converting circuit 80. Then, one output of the current to voltage converting circuit 80 is supplied to one input 86 of a high gain amplifier circuit 88.

The output of the high gain amplifier circuit 88 is supplied to a voltage chopping circuit 90 which includes an astable multivibrator 92 and a voltage chopping transistor circuit 94. The output from the voltage chopping transistor circuit 94 is supplied to an isolation transformer 96 having its output fed through a rectifier circuit 98. The output voltage from the rectifier circuit 98 appears across so-called violet and gray terminals 100 and 102 respectively. This voltage is supplied to or placed across a piezo ceramic bender 104. Those skilled in the art can look on the bender 104 as the functional equivalent to a filter relative to the rectifier circuit 98.

As is known in the art, the piezo ceramic bender 104 is placed adjacent a nozzle orifice "p" at one outlet of a control chamber. The control chamber has an inlet through a throttling restriction coupled to a source of gas or air pressure. The chamber also has an outlet that is coupled to a pressure outlet line. The pressure from the source of air pressure is coupled to fitting 64 shown in FIG. 6 and the output pressure line is coupled to the fitting 66 which in turn is connected to the various elements in the pneumatic system which are to be operated by or receive the controlled pressure. The pressure in the outlet pressure line is also coupled to an input 106 of a pressure sensor transducer 108 which also has a vent port 110. The sensor is operated in a backward sense and the vent side is protected from atmosphere pressure with a dielectric gel such as Dow Corning 3-6527. Although not shown in FIG. 7, it will be understood that the pressure sensor transducer 108 has four piezo resistances connected in a Wheatstone bridge configuration as shown in FIG. 3.

The output from the pressure sensor 108 is supplied to a span temperature compensation circuit 114. Then the output from the span temperature compensation circuit is supplied to another input 116 of the high gain amplifier circuit 88.

With the circuits so far described, it will be apparent that a current signal coming in to the terminals 60 and 62 is converted to a voltage in the converting circuit 84 and then compared in the high gain amplifier circuit 88 with a voltage that is related to the actual output pressure exiting outlet fitting 66. Then, the output of the high gain amplifier 88 will change relative to the input voltages received at inputs 86 and 116 until they are balanced or substantially equal indicating that the bender 104 has been moved closer to or away from the outlet orifice to change the pressure in the chamber which supplies air or gas pressure to the outlet pressure lines.

As will be described in greater detail hereinafter, the voltage regulating circuit 76 produces a regulated voltage $V_R$ on a positive voltage rail 118 that also produces a common or ground potential $V_C$ on another voltage rail 120. Further, the voltage regulator circuit 76 produces a bias or reference voltage $V_B$ on a voltage rail 122. These voltages are then supplied to the various circuit elements of the electrical circuit 58 and also to a low current shutoff circuit 124 and a high current shutoff circuit 126. As will be described in greater detail hereinafter, the low current shutoff circuit 124 is coupled to the output of the span temperature compensation circuit 114 for driving the output of same low when the input current is at, just above or just below the zero setting on the zero setting circuit 78. This would typically be at approximately 4 milliamps. The low current shutoff circuit 124 would then drive the output from the span temperature compensation circuit 114 high and this would result in the voltage on the piezo ceramic bender 104 going low causing it to move to its furthest position away from the nozzle orifice. This would then immediately set the pressure at the output fitting 66 to the lowest output pressure such as 0 psi.

The high current shutoff circuit 126 is coupled to a gain control circuit 128 of the high gain amplifier circuit 88. In this way, when the input current is at a maximum, such as at, just below or just above 20 milliamps, the high current shutoff circuit 126 will drive the high gain amplifier circuit 88 into saturation so that the maximum voltage is supplied at the violet and gray terminals 100 and 102 to cause the piezoceramic bender 104 to move to its position closest to the nozzle orifice thereby to output the highest pressure from the fitting 66 such as a pressure of 20 (i.e., supply pressure) psi.

In addition to the span temperature compensation circuit 114, a zero (minimum current/pressure) temperature compensation circuit 130 can be associated with and coupled to the span temperature compensation circuit 114 and the pressure sensor 108.

Also the electrical circuit 58 can include a non-linearity compensation circuit 132 coupled to the output of the span temperature compensation circuit 114.

Returning now to the red and blue input terminals 70 and 74, the subcircuits of the electrical circuit 58 of the electropneumatic transducer system 42 briefly described above will now be described in further detail.

The current coming in to terminal 70 is passed through a rectifier 134 and from there to a voltage divider circuit 136 forming part of the voltage regulating circuit 76. The voltage at a junction 138 of the voltage divider circuit 136 is supplied to one input of a comparator amplifier 140, the other input of which is coupled to the rail 122 having the bias or reference voltage thereon. This voltage is typically +0.2 volts. The output of the amplifier 140 is fed to a regulating transistor 142 which together with a capacitor 144 maintains a regulated voltage of approximately +4.75 volts on the voltage rail 118.

The reference and bias voltage $V_B$ on rail 122 is supplied to a unity gain buffer amplifier circuit 146, the output of which supplies inputs to the low current shutoff circuit 124 and the high current shutoff circuit 126 as will be described in greater detail hereinafter.

The zeroing circuit 78 includes a series connected resistor circuit comprising a first resistor 148, a potentiometer resistor 150 and a resistor 152, which are connected between the positive rail 118 and the common rail 120 as shown. The set screw 50 is mechanically coupled to a wiper arm of the potentiometer resistor 150 for adjusting the position of same. Such wiper arm is also connected through resistors 154 and 156 to the blue terminal 74 which has the voltage $V_U$ thereon which is proportional to input current. A junction 157 between the resistors 154 and 156 is coupled to an inverting input 158 of the comparator amplifier 84. The other input 160 of the amplifier 184 is coupled through a resistor 162 to a rail 164 having the buffered bias voltage $V_B$ thereon, the rail 164 being connected to the output of the buffer amplifier circuit 146.

A feedback loop from an output 166 of amplifier 84 comprised of series connected resistor 168, potentiometer resistor 170 and resistor 172 is connected to resistor 174. These three resistors 168, 170 and 172 comprise the span setting circuit with a wiper arm of the potentiometer resistor 170 being mechanically coupled to the set screw 52 and through a resistor 174 to input 158 of the amplifier 84 as shown.

Additionally, it will be noted that there is a resistor circuit 176 coupled between the voltage Vu which is proportional to input current blue terminal 74 and the common rail 120. This circuit 176 includes open circuit terminals P1 and P2. When the terminals P1 and P2 are open circuited as shown, the electrical circuitry 58 is set for 4–20 milliamp operation. Then, when a jumper is inserted across the terminals P1 and P2, the circuit 58 is set for 10–50 milliamp operation. Then, of course, the span of 4–20 milliamp operation is set by the position of the wiper arm of potentiometer resistor 170 which also controls some of the gain of the comparator amplifier 84.

Returning now to the current-to-voltage converting circuit 80, the output 166 thereof is coupled through a capacitor leading circuit 178 to the input 86 of the high gain amplifier 88. A control signal at an output 180 of the amplifier 88 is supplied through a resistor 182 to the four transistor voltage chopping circuit 94 which has base input lines 187 and 186 controlled by the output of the multivibrator 92 that is operated as a free running oscillator with a timing circuit 188 coupled thereto and which is driven by the regulated voltage plus $V_R$ connected thereto as shown. An overvoltage Zener diode protection circuit arrangement 190 is provided between the output of the resistor 182 and the common rail 120 for intrinsic safety. The output from the four transistor voltage chopping circuit 94 is supplied to a primary winding 192 of the transformer 96. The secondary winding 194 of the transformer 96 has from three to ten times more turns than the primary winding 192 to provide sufficient voltage buildup across the transformer 96 to drive the bender 104. This output voltage is rectified through a diode 196 and resistor 198 comprising the rectifier circuit 98 and this rectified voltage is applied to the output terminals 100 and 102 for supplying a voltage across the piezoceramic bender 104.

The piezoceramic bender 104 can also be referred to as a voltage sensitive nozzle flapper. Typically such bender or flapper 104 is comprised of a thin strip of conductive brass sandwiched between two layers of ceramic material and the ceramic plate are coated on the outside with an electrically conductive material such as silver or nickel. The nickel plated bender can come in contact with a clamp to hold it to the housing 44 as well as coming in contact with the nozzle. Piezoceramic benders of this type can be obtained from Piezoelectric Products, Inc. of Metuchen, N.J.. Also, one form of bender is sold under the trademark Bimorph.

The supply voltage or regulated voltage $V_R$ from the voltage regulator circuit 76 is typically set at +4.75 volts such that the four transistor voltage chopping circuit will provide approximately 8 volts peak to peak across the primary winding 192 of the transformer 96. Typically the turns ratio is such that the output from the rectifier circuit 98 is between 0 and 30 volts. The transformer 96 is typically a low inductance transformer and is driven by a quad transistor chopping circuit 94. By using such a circuit one lowers the voltage output required from the circuitry 58 to the BIMORPH by a factor of two since by feeding the chopped DC voltage to a transformer a doubling of the regulated supply voltage $V_R$ is obtained and then such doubled voltage (8 volts peak to peak) is only stepped up by the transformer 96 to the voltage required for operating the piezoceramic bender 104. This meets the intrinsic safety requirements of having a relatively low inductance transformer protected by Zener diodes 190. Also, the transformer 96 serves to isolate the bender 104 from the electrical circuit 58. This is shown in FIG. 8 where the secondary winding 194 of the transformer 96 as well as the bender 104 are tied to the housing casing as shown. This results in galvanic isolation of the bender 104 from the electrical circuit 58 of the system 42 and eliminates the need to electrically isolate the bender 104 from the housing 44.

It will be noted that a pair of open circuit jumper contacts P4 and P5 are situated in one line to the violet terminal 100 and another pair of jumper contacts P6 and P7 are situated in a line to the gray terminal 104. These jumper contacts are provided for reversing the operation of the system. Normally, a jumper is situated across P4 and P5 and a jumper is situated across P6 and P7 to complete the circuit for normal (direct action) operation. However, for reverse operation, (reverse action) that is, getting a low pressure with high current and a high pressure with low current, a jumper would be inserted across P4 and P6 and another jumper would be inserted across P5 and P7.

As explained briefly above, the sensor 108 has four piezoresistances therein such as piezoresistances Ra through Rd and the output across these piezoresistors is supplied through buffer resistors 200 and 202 to inputs 204 and 206 of an amplifier 208. The amplifier 208 functions in the same manner as the amplifier 16 in FIG. 3 and has its output 210 connected to a voltage divider circuit 212 comprised of resistors R1 and R2. A tap from the voltage divider circuit 212 is coupled through resistor $R_{fb}$ and a temperature adjustment resistor circuit 214 to one corner 216 of the piezoresistance Wheatstone bridge in the sensor 108. This corner 216 of the bridge is also coupled through the resistance 202 to the input 206.

If desired, a zero (minimum current) temperature compensation circuit 130 can be provided which consists of resistors 218, 220, adjustable resistor circuit 222 and resistor 224 coupled in series between the regulated voltage and system common rail 120 with a resistance tap from the adjustable resistance circuit 222 through a resistor 1224 to input 206 of the amplifier 208.

The voltage divider circuit 212 provides the constant current generation required to provide span temperature compensation by passing a constant current through resistor Rfb of the bridge within sensor 108 as described in more detail above in connection with the description of FIG. 3. Then, the series resistor circuit and the tap therefrom through resistor 1224 coupled to input 206 can be adjusted by adjusting the resistance of the variable resistance circuit 222 to provide zero temperature compensation. Typically, the circuit is operated at three different values and a set of three simultaneous equations are generated for picking the values of the resistors in the span temperature compensation circuit and the resistors in the zero temperature compensation circuit. Also, other resistors are connected into the circuit, namely, resistors 226 and 227 connected between the sensor 108 and the voltage common rail 120 and the resistors 228 and 229 coupled between the outputs of the bridge in the sensor 108 and the regulated voltage rail 118 as shown. This provides for great flexibility in the combined pressure sensor 108 and span temperature compensation circuit 114 dependent upon the resistor values selected.

Also it will be noted that open circuit contacts P8 and P9 are provided in the input line to inputs 204 of amplifier 208 and open circuit contacts P10 and P11 are provided in the other input line to the input 206 of amplifier 208. These open circuit contact connections are correlated with the connections of contacts P4, P5, P6 and P7. In this respect, for direct action, contacts P8 and P9 are connected by a jumper and contacts P10 and P11 are connected by a jumper. For reverse action, P8 is connected to P10 and P9 is connected to P11. This would be at the same time that P4 is connected to P6 and P5 is connected to P7. Also in the tap connection from the resistor circuit 130, there are three contacts P12, P13 and P14. For zero temperature correction where temperature increases result in a desired zero increase for the output of amplifier 208, contact P12 is connected to contact P13. Then for zero temperature correction where temperature increases result in a desired zero decrease for the output of amplifier 208, contact P13 is connected to contact P14.

The temperature compensated output voltage at the output 210 of amplifier 208 is then supplied through a capacitor leading circuit 230 in the feedback loop to the input 116 of the high gain amplifier circuit 88. In this way, the input control signal supplied to input 86 of the amplifier 88 can be correlated with a control signal at input 116 which is related to the actual output pressure from the electropneumatic transducer system 42.

Since the output from the sensor 108 is not always linear, a non-linear correction circuit 132 is provided. This circuit 132 includes an input resistor 232 coupled to the output 210 of the amplifier 208 which supplies a current through a diode 234 to the base of the transistor 236. The transistor 236 is coupled in series with a control resistor 238 which is coupled to a junction in a voltage divider circuit 240 which is coupled to a feedback resistor 242 to the input 204 of the amplifier 208.

With this circuit, the gain of the amplifier 208 is changed when a certain threshold output voltage at the output 210 is sensed so that the resistor 238 can be coupled into the circuit with the resistors 246 and 248 of the voltage divider circuit 240.

The low current shutoff circuit 124 comprises a voltage divider circuit 250 connected across $V_R$ and $V_U$ which supplies a control voltage to an inverting input 252 of a comparator amplifier 254. Another input 256 of the comparator amplifier 254 is coupled to the bias voltage rail 164 which has the bias voltage $V_B$ thereon. This voltage is also the band gap voltage of the amplifier 104 and is at approximately +0.2 volts.

When the voltage at the input 252 goes below the 0.2 volts at the input 256, the output of the comparator amplifier 254 is increased and supplied to the gate of a field effect transistor 258 which is coupled across the resistors 246 and 248. Thus, when the field effect transistor 258 is turned fully on by the output voltage from the comparator amplifier 254, resistors 246 and 248 are short circuited to drive the output from the amplifier 208 at the output terminal 210 to saturation and this way cause the high gain amplifier circuit 88 to go to zero thereby to shut off the supply of voltage from the four transistor voltage chopping circuit 94 to the primary 192 of the transformer 196. This results in the piezoceramic bender 104 going to its furthest position at zero voltage from the nozzle orifice resulting in maximum escape of air pressure through the nozzle and lowering of the output pressure in fitting 66 to 0 psi or whatever the low pressure setting is.

The high current shutoff circuit 126 has a voltage divider circuit 260 connected across the regulated voltage $V_R$ and the voltage $V_U$, (which is proportional to current) namely regulated voltage rail 118 and voltage rail 262. Here the reference voltage is supplied via the rail 164 to the inverting input 264 of an amplifier 266 and a junction of the voltage dividing circuit 260 is connected to the other input 268 of the comparator amplifier 266. Here when the low voltage at the input 268 falls below the +0.2 volts at the input 264 as a result of the voltage drop across the resistor circuit 176 connected between the common rail 120 and the voltage vu on rail 262, the output of the comparator amplifier 266 goes high and is fed to the gate of a field effect transistor 270 to turn same fully on. This results in the shorting out of the resistor 272 forming part of the gain control circuit 128 for the high gain amplifier circuit 88 thereby to drive the high gain amplifier circuit into saturation to put maximum output voltage through the resistor 182 to the four transistor voltage chopping circuit 94. This results in a maximum voltage being supplied to the bender 104 which is then forced to its nozzle orifice closed position against the nozzle orifice to increase the output pressure to the maximum pressure such as a maximum pressure of 20 psi.

For changing the range of low current shutoff such as to a range between 4 and 4.1 milliamps, a pair of open circuit contacts P15 and P16 are provided across a resistor 274 of the voltage dividing circuit 250. A jumper can then be inserted across the contacts P15 and P16 to short out resistor 274 to change the operating point of the low current shutoff circuit to a value slightly above 4 milliamps.

Likewise, a pair of open circuit contacts P17 and P18 are connected to a resistor 276 in the voltage divider circuit 260 of the high current shutoff circuit 126 so that the shutoff point or operating point of the circuit 126 just below, at, or just above 20 milliamps can be set by inserting a jumper between the contacts P17 and P18 or removing such jumper.

With the electropneumatic transducer system 42 having the electrical circuit 58 with the various subcircuits thereof as described above, a number of advantages are obtained over previously proposed electropneumatic transducer systems. In this respect, a minimum voltage drop is provided of up to no more than 6 volts across the input terminals 60 and 62. Also, with the open circuit contacts P1 and P2, the use of a jumper can provide either 4-20 milliampere 3-15 psi operation or 10-50 milliampere 3-15 psi operation.

A reverse action can be obtained by changing the jumpers associated with the contacts P4 through P7 and P8 through P11 as described above.

Furthermore, the low current shutoff circuit 124 can provide a tight shutoff at 3.9 milliamps to 0 or some low value psi. The high current shutoff circuit 126 then provides for a full supply pressure output pressure when the current is just below or just above 20 milliamps.

Furthermore, the piezoceramic bender 104 is designed to be vibration independent. Also, as described above, the transformer 96 provides galvanic isolation between the housing 44 and the electrical connections of the electrical circuit 58.

Figure 9:
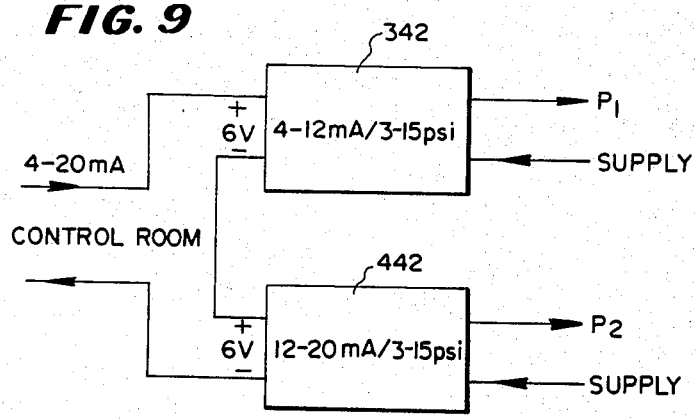
FIG. 9 is a block schematic circuit diagram of two transducer systems of the present invention connected in series and supplied with no more than 10 to 12 volts, the first system operating from approximately 4 to 12 mA and 3 to 15 psi output pressure and the second system operating from approximately 12 to 20 mA and 3 to 15 psi output pressure.

With the minimum voltage drop of no more than 6 volts across the input terminals 60 and 62, the pressure transducer system 42 can be coupled in series with another pressure transducer system 42 to provide what is called split ranging of the operating current for two pressure output lines. Such a circuit connection is shown in FIG. 9 where a first electropneumatic transducer system 342 is designed to operate between 4 and 12 milliamps for supplying an output pressure of between 3 and 15 psi. The voltage across the input terminals of the electropneumatic transducer system 342 is no more than 6 volts. Then, this system 342 is coupled in series with a second elctropneumatic transducer system 442 which is designed to operate between 12 and 20 milliamps and provide an output pressure between 3 and 15 psi.

Figure 10:
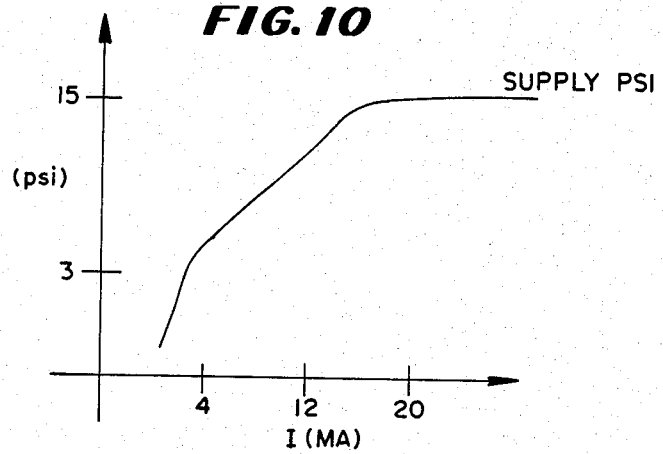
FIG. 10 is a graph of the current versus pressure in the first electropneumatic transducer system shown in FIG. 9.
Figure 11:
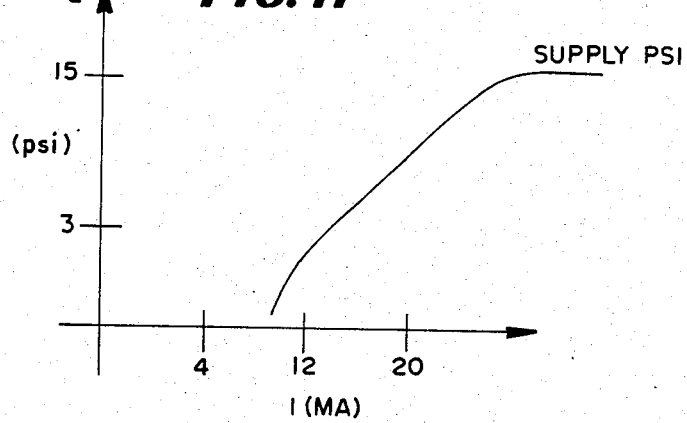
FIG. 11 is a graph of the current versus pressure in the second electropneumatic transducer system shown in FIG. 9.

The graph of output pressure from the electropneumatic transducer system 342 vs. input current is shown graphically in FIG. 10 and the output pressure vs. current from the second electropneumatic transducer system 442 is shown in the graph of FIG. 11.

From the foregoing description it will be apparent that the electropneumatic transducer system 42 and its electrical circuitry 58 of the present invention provide a number of advantages, some of which have been described above and others of which are inherent in the invention. Also it will be apparent that modifications can be made to the system 10 and circuitry 58 thereof without departing from the teachings of the invention. Accordingly, the scope of the invention is only to be limited as necessitated by the accompanying claims.

I claim:

1. In a pneumatic system having a chamber which is in fluid communication with a source of pressurized gas, an outlet nozzle open to an outlet orifice, and an outlet conduit whose internal pressure is a function of the flow of fluid through said outlet orifice, a control system, comprising:

a comparator defining two inputs and one output;

signal supplying means, connected to one input of said comparator, for supplying an electrical signal characteristic of the pressure to be maintained within said outlet conduit;

electro-pneumatic means, defining a bridge of piezo-resistors whose resistance varies in response to the pressure within said outlet conduit, for supplying an electrical signal which is a characteristic of the actual pressure within said outlet conduit;

voltage sensitive nozzle flapper means, mounted adjacent the outlet orifice and electrically connected to the output of said comparator, for regulating the flow of fluid out of the outlet conduit;

an amplifier defining an inverting input, a noninverting input, and an output which is connected to the other input of said comparator;

constant current generator means, connected between one corner of said bridge of piezo-resistors and said amplifier output, for supplying constant current through at least one of said piezo-resistors;

a regulated voltage supply, whose output is connected across the two corners of said piezo-resistor bridge which are adjacent said one corner, for supplying regulated voltage to said electropneumatic means; and a voltage divider circuit, connected across the output of said amplifier, for supplying a voltage signal to a corner of said bridge of piezo-resistors opposite said one corner, said one corner and said opposite corner of said bridge being connected to the inputs of said amplifier.

2. The control system of claim 1, wherein said comparator is coupled to said voltage sensitive nozzle flapper means through an isolation circuit which provides galvanic isolation for said voltage sensitive flapper.

3. The control system of claim 2, wherein said isolation circuit comprises a transformer and a filter circuit coupled between the output of said comparator and said voltage sensitive nozzle flapper means, said transformer defining a primary winding and a secondary winding.

4. The control system of claim 3, further including a voltage chopping circuit coupled between the output of said comparator and said isolation transformer.

5. The control system of claim 4, wherein said voltage chopping circuit includes a free-running astable multivibrator circuit coupled to the output of said comparator and a four transistor voltage chopping circuit which is coupled to the output of said multivibrator circuit and which has an output coupled to the primary winding of said transformer.

6. The control system of claim 1, wherein said voltage sensitive nozzle flappler means is a ceramic bender.

7. The control system of claim 1, wherein said comparator is a voltage comparator, and wherein said signal supplying means includes a current-to-voltage converting means for converting a current signal representative of the pressure to be maintained within said output conduit to a voltage signal supplied to one input of said voltage comparator.

8. The control system of claim 7, wherein said current-to-voltage converting means includes a gain control circuit having an adjustable potentiometer which sets the operating span/current range of operation of the control system.

9. The control system of claim 7, further including: a zero setting circuit coupled to the input of said current-to-voltage converting means and an adjustable potentiometer for setting the zero/threshold operating current for placing said control system in operation.

10. The control system of claim 1, further including a high current shut-off means, coupled between said signal supplying means and said comparator, for causing said output of said comparator to go into saturation when the current input signal reaches a pre-determined upper value.

11. The control system of claim 10, wherein said comparator is a high-gain comparator having a gain circuit, the output of said high-current shut-off means being coupled to said gain circuit for controlling the gain of said high-gain comparator.

12. The control system of claim 10, wherein:

said regulated voltage supply produces a positive regulated voltage, a common voltage, and a low reference and bias voltage; and wherein said high-current shut-off circuit means includes a comparator having one input coupled to said low reference and bias voltage output of said regulated voltage supply and another input coupled to the junction in a voltage divider circuit coupled between said positive regulated voltage and an unregulated voltage input terminal to said control system.

13. The control system of claim 1, further including a low current shut-off means, coupled between said signal supplying means and said one input of said comparator, for driving said one input to zero when the input current signal reaches a pre-determined lower value, whereby the output of said comparator goes to zero.

14. The control system of claim 13, wherein:

said regulated voltage supply provides a regulated voltage output, a common output, and a low reference and bias voltage output; and wherein said low current shut-off means includes a comparator having one input connected to said low reference and bias voltage output of said regulated voltage supply, and another input connected to the junction in a voltage divider coupled between the said regulated voltage output and an unregulated voltage input terminal to said control system.

15. The control system of claim 1, further including a non-linearity correction circuit, coupled to the output of said amplifier, for correcting the non-linearity of said electro-pneumatic means; and further including gain control means, coupled to said non-linearity correction circuit, for controlling the gain of said amplifier, said non-linearity correction circuit being placed in operation in the event that a pre-selected output voltage from said amplifier is exceeded, the gain of said amplifier being reduced in the event that said threshold output voltage is exceeded.

16. In a bridge of strain-sensitive resistances which are mounted so that mechanical distortions cause a change in bridge element resistance, a compensation circuit comprising:

a regulated voltage supply, the output of which is connected across the two corners of said bridge;

a comparator defining an inverting input, a non-inverting input and a voltage output;

voltage divider means, coupled across the output of said comparator, for providing a voltage signal to one corner of said bridge, that corner and an opposite corner of said bridge being coupled to the input of said comparator to, enable said comparator to function as an amplifier; and a constant current generator circuit, coupled between said comparator output and said voltage supply, for supplying a constant current to said opposite corner of said bridge.

17. The compensation circuit of claim 16, wherein said bridge resistance elements are piezo-resistors.

18. The compensation circuit of claim 16, wherein said constant current generator circuit includes two resistors joined in series between said comparator output and said voltage supply and a third resistor joined to said opposite corner and the common connection between said two resistors.

* * * * *